United States Patent [19]

Tomes, Jr.

[11] Patent Number: 4,682,411

[45] Date of Patent: Jul. 28, 1987

[54] WIRE IDENTIFYING SLEEVE APPLICATOR

[76] Inventor: Herbert Tomes, Jr., Rte. 3, Box 1160, Callahan, Fla. 32011

[21] Appl. No.: 898,630

[22] Filed: Aug. 21, 1986

[51] Int. Cl.[4] .............................................. B23P 19/02

[52] U.S. Cl. ........................................ 29/745; 29/235; 29/241; 29/758; 29/267; 29/282

[58] Field of Search ................. 29/235, 280, 282, 267, 29/745, 433, 450, 241, 758, 252

[56] References Cited

U.S. PATENT DOCUMENTS

| | | | |
|---|---|---|---|
| 2,441,756 | 5/1948 | De Swart | 29/282 |
| 3,177,566 | 4/1965 | Hester | 29/252 |
| 4,432,124 | 2/1984 | Brevers | 29/235 |
| 4,581,805 | 4/1986 | Wrobel et al. | 29/235 |

*Primary Examiner*—Robert C. Watson
*Attorney, Agent, or Firm*—Arthur G. Yeager

[57] ABSTRACT

A hand tool for applying identification sleeves to electric wire including a sleeve mandrel, onto which identification sleeves are threaded, and a mandrel stripper including a retainer to hold one end of the mandrel and a stripper guide to slide along the mandrel and push the sleeves over the end of an electric wire, the mandrel stripper including a telescoping tubular body with a thumb operable lever to extend the body to its full length or withdraw one telescopic section into the other.

14 Claims, 27 Drawing Figures

WIRE IDENTIFYING SLEEVE APPLICATOR

BACKGROUND OF THE INVENTION

In small scale electrical wiring systems, wires into and out of various panels, switches, etc. are identified by color in order to be sure the proper wire is attached to the proper terminal. In large scale electrical systems, color coding is totally inadequate because there are not enough distinguishable colors to do the job. The problem is now handled by assigning a code of numbers and/or letters to each wire. One method of applying the code to the wire is by placing around the wire a sleeve for each number and letter in the code. Sleeves are manufactured in the form of long strands of sleeves coiled on a small reel for each number and letter. Individual sleeves can be torn off the strands of each reel and placed on the wire in the appropriate order to produce the code for the wire. It is desirable that each sleeve, when applied to the wire, fit snugly so as to be retained in place by friction and this is accomplished by making the sleeve expandable so as to be positioned on the wire and then contractable to fit tightly when in place. Placing the individual sleeves on the wire by hand is tedious and troublesome because of dropping and losing the small sleeves and the difficulties of causing each sleeve to expand sufficiently to be slipped on the wire.

There are two known U.S. patents which describe tools for applying such sleeves to wire. Design U.S. Pat. No. 257,211 shows a rod with a forked end, but there is no description of how to use the tool. U.S. Pat. No. 3,177,566 shows a pneumatic gun for this purpose. Neither of these tools is sufficiently convenient for the electrician who needs a small portable tool which is easy to operate and require the minimum of manipulation to accomplish the purpose.

It is an object of this invention to provide a novel, small, simple tool for applying identification sleeves to electric wire. It is another object of this invention to provide such a tool that apply sleeves to wire with a minimum of handling of individual sleeves. Still other objects will become apparent from the more detailed description which follows.

BRIEF SUMMARY OF THE INVENTION

This invention relates to a tool for applying identification sleeves to electric wire including a sleeve mandrel and a mandrel stripper, said sleeve mandrel comprising an elongated thin straight rod having a load end and a discharge end and adapted to have identification sleeves threaded onto said rod, said mandrel stripper comprising a plurality of telescoping tubular members having a retainer affixed to one end of said telescoping tubular member for anchoring the loading end of said mandrel and a stripping guide affixed to the other end of said telescoping tubular members adapted to encircle said mandrel adjacent the discharge end thereof, said mandrel having at said loading end fastening means for attachment to said retainer and at said discharge end a plurality of springy lengthwise fingers; and means to move said stripping guide linearly along said mandrel until said guide extends beyond said springy fingers.

In one specific embodiment of this invention the mandrel stripper comprises two telescoping tubular sections which are moved between a fully extended position and a fully retracted position by lever arms operated by thumb pressure. In another embodiment the mandrel is anchored to the mandrel stripper by the cooperation of a neck on the mandrel being held by a slit in the retainer. In another embodiment the mandrel has an eye at the load end to attach to said retainer having a hook means to engage said eye. In still another embodiment the stripping guide includes two strips spring biased to abut against each other along a line with a passageway on the line for the mandrel to slide therethroúgh.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
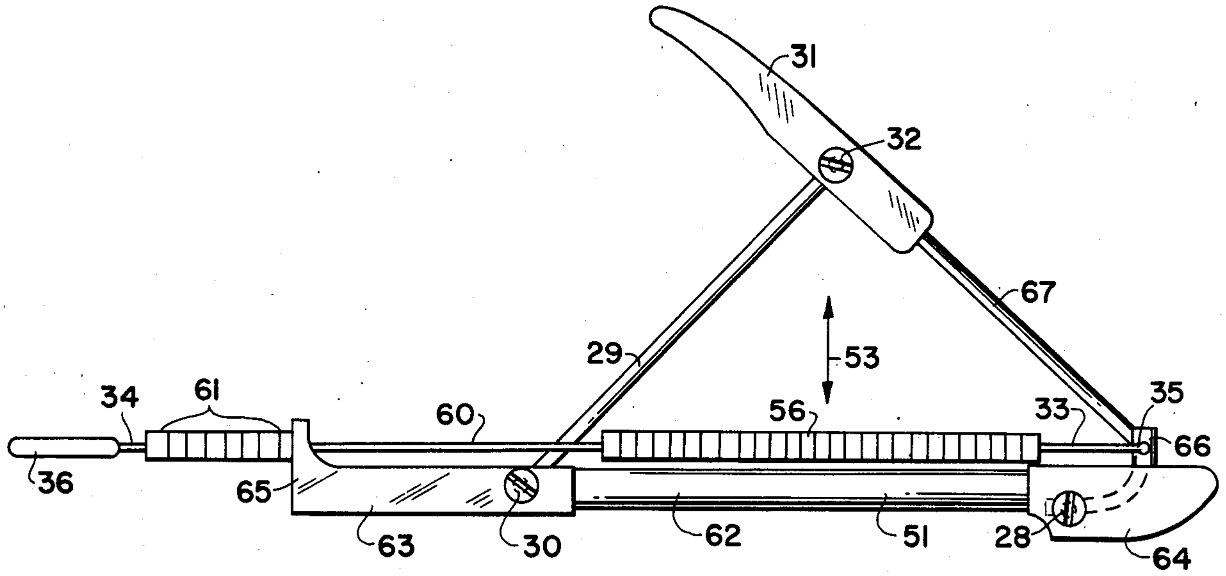
FIG. 1 is a side elevational view of the tool of this invention in its retracted position.
Figure 2:
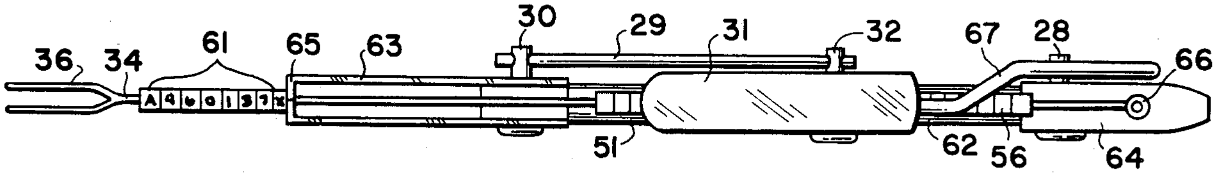
FIG. 2 is a top plan view of the tool shown in FIG. 1.
Figure 3:
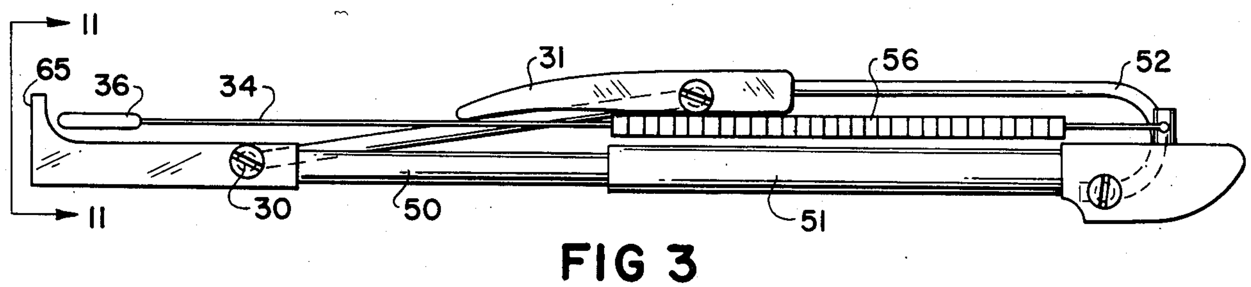
FIG. 3 is a side elevational view of the tool of this invention in its extended position.
Figure 4:
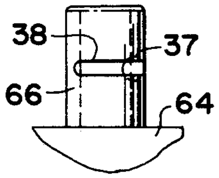
FIG. 4 is a front elevational view of one type of retainer used in this invention.
Figure 5:
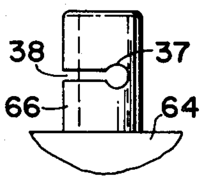
FIG. 5 is a side elevational view of the retainer of FIG. 4.
Figure 6:
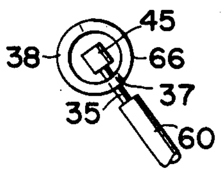
FIG. 6 is a top plan view of the retainer of FIGS. 4 and 5 with the mandrel inserted therein.
Figure 7:
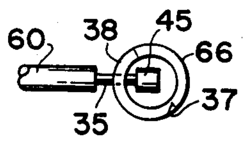
FIG. 7 is a top plan view of the retainer of FIG. 6 with the mandrel in the operating position.

In FIGS. 1-3 the complete assembly of the tool of this invention is shown. The tool is made up of two attachable-detachable component parts; a sleeve mandrel 60 and a mandrel stripper 62. Sleeve mandrel 60 is a long slender rod of any convenient cross section, e.g., round, square, or the like. Mandrel 60 has a load end 33 and a discharge end 34. At loading end 33 there is a reduced size neck 35. At discharge end 34 there are a plurality of springy fingers 36 which can expand radially to permit the end of a wire to be inserted therein, and which can be contracted to a small cross section when there is no wire present. Sleeves 61 are shown threaded on mandrel 60 and assembled in a coded number for application to a wire. A reserve supply of sleeves 56 are threaded on mandrel 60 available to be sorted into the next coded number of sleeves 61.

Mandrel stripper 62 has a forward end 63 and an aft end 64, connected by a forward tube 50 telescoping inside of aft tube 51. Forward end 63 includes a stripper guide 65 which supports mandrel 60 near its discharge end 34 and pushes sleeves 61 off the discharge end 34 over fingers 36 when sleeves 61 are applied to a wire. Aft end 64 has a retainer 66 which grips the loading end 33 of mandrel 60. When it is expected to apply a particular code to several wires the individual sleeves may be threaded onto mandrel 60 ahead of time so as to have several codes in a reserve supply as at 56 to be applied as need to individual wires. The operation of the tool of this invention requires that stripper guide 65 be moved from the position shown in FIG. 1 to the position shown in FIG. 3 and then returned to the position in FIG. 1. This movement is accomplished by beginning with telescoping tubes 50 and 51 in the retracted position shown in FIG. 1 and moving the tube 50 to the extended position shown in FIG. 3, followed by retraction to the position of FIG. 1. In the preferred mode of operation this reciprocal movement of tubes 50 and 51 is accomplished by a leverage system including three pivots and two arms. First arm 67 is pivoted at one end to aft end 64 by pivot pin 28. Second arm 29 is pivoted at one end to forward end 63 by pivot pin 30. The other ends of both arms 67 and 29 are connected by pivot pin 32. Thus by moving pivot pin in the directions of arrow 53 forward end 63 may be moved between a fully retracted position in FIG. 1 to a fully extended position in FIG. 3. For convenience of operation, thumb tab 31 is included permitting the downward movement of pivot pin 32 to occur by pressing downward on tab 31 with the thumb of the user. The upward motion of pivot pin 32 is accomplished by pulling tab 31 upward by gripping tab 31 between the thumb and index finger. Preferably arm 67 is provided with an offset portion 52 where it connects with pivot pin 28 so that thumb tab 31 and arm 67 will not interfere with mandrel 60. It is to be understood that other equivalent mechanical movements can be employed to move forward end from its retracted to its extended positions and back again. For example, screw action can be employed, spring retrieval can be used, a plunger action is operable, etc.

Figure 8:
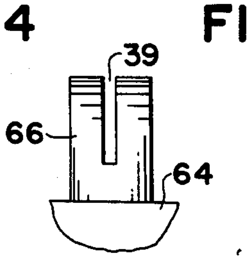
FIG. 8 is a front elevational view of a second type of retainer used in this invention.
Figure 9:
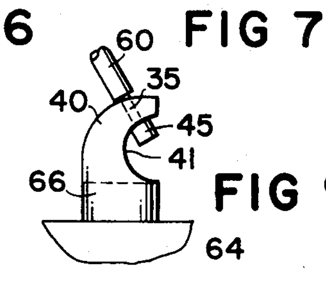
FIG. 9 is a side elevational view of the retainer of FIG. 8 with the mandrel inserted therein.
Figure 10:
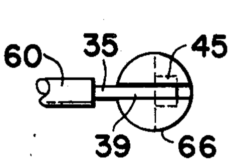
FIG. 10 is top plan view of the retainer of FIGS. 8 and 9 with the mandrel in the operating position.

In FIGS. 4-10 there are shown the means for connecting retainer 66 to the loading end of mandrel 60. In one type of retainer 66 there is an enlarged passageway 37 through the wall of a vertical tubular retainer connected to a horizontal slot 38 through the wall. Mandrel 60 is fashioned with a neck 35 having a reduced cross sectional dimension (diameter in case the mandrel is cylindrical) adjacent loading end 33 so as to leave a head 45 of the full cross sectional dimension. Passageway 37 permits head 45 to be inserted as at FIG. 6. Mandrel 60 is then swung around to the operating position as at FIG. 7 with neck 35 being slidable in slot 38 but with head 45 being larger than the width of slot 38 so that mandrel 60 is anchored in the retainer and cannot be removed therefrom except by swinging mandrel around to the position in FIG. 6. A second type of retainer 66 is shown in FIGS. 8-10 where the retainer is a solid rod with a vertical slot 39 extending from an open end at the top to a closed end in the middle portion of the retainer. In this instance slot 39 is sufficiently wide to admit neck 35 but is narrower than the width of head 45. Mandrel 60 is attached to retainer 66 by tilting it upward as in FIG. 9 while introducing neck 35 into the open end of slot 39. Mandrel 60 is then lowered to a horizontal operating position causing mandrel 60 to be anchored to retainer 66. That anchoring is enhanced by shaping retainer with an outside convex curve 40 and an inside concave curve 41 which tends to keep head 40 and mandrel 60 in a horizontal position.

Figure 11:
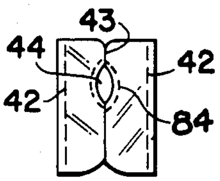
FIG. 11 is a front elevational view of the stripper guide of this invention.

In FIG. 11 there is illustrated the front view of the stripper guide 65. It comprises two L-shaped strips 42 fastened to forward end 63 so that the forward edges abut along vertical line 43. The length of strips 42 and their material of construction, a stiff springy metal or plastic, e.g., steel, causes strips 42 to have a spring bias toward each other along line 43 permitting them to be spread apart but to automatically return to the abutting position shown in FIG. 11 when no spreading force is applied. Hole 44 is centered on line 43 and is generally of a size and shape to approximately match the circumference of mandrel 60 and thereby permits mandrel 60 to slide through hole 44 smoothly with a minimum of friction. Preferably hole 44 is tapered as shown at 84, larger on the inside and smaller on the outside of guide 65 so as to provide better contact with the rear surface of sleeves 61.

Figure 12:
FIG. 12 is a front elevational view of one type of mandrel of this invention.
Figure 13:
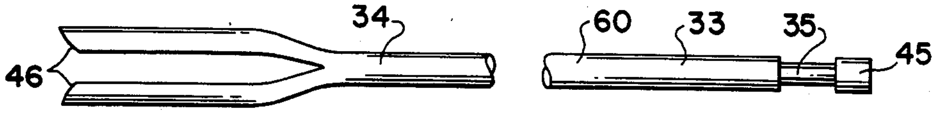
FIG. 13 side elevational view of the mandrel of FIG. 12.
Figure 14:
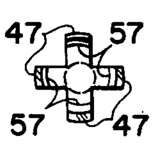
FIG. 14 is a front elevational view of a second type of mandrel of this invention.
Figure 15:
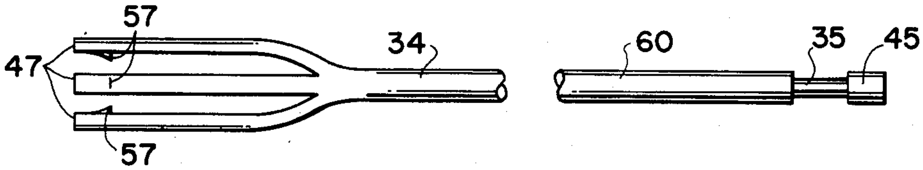
FIG. 15 is a side elevational view of the mandrel of FIG. 14.

In FIGS. 12-15 there are shown two types of mandrels which differ only in the design of the springy fingers 36 at the discharge end 34 of mandrel 60 as shown in FIGS. 1-3. The purpose of these fingers is to provide a recess for inserting the end of a cut piece of electric insulated wire and to provide a guide for the identifying sleeves to be pushed from mandrel 60 onto the wire. In FIGS. 12 and 13 fingers 46 are two generally semicircular strips which when clamped together will grip the outside of the wire and almost totally enclose the wire. In FIGS. 14 and 15 there are shown four thin strips 47 which when clamped together will grip the wire on four sides although each side is slightly smaller than that of the strips 46 in FIGS. 12 and 13. At the loading end 33 of mandrel 60 there is a reduced diameter neck 35 and head 45 as described above for engagement with the slots in retainer 66. Near the end of fingers 47 are shown teeth 57 which tend to grip the wire over which sleeves 61 are to be placed. Teeth 57 may or may not be employed with any of the fingers 46 and 47 on the mandrel of this invention.

Figure 16:
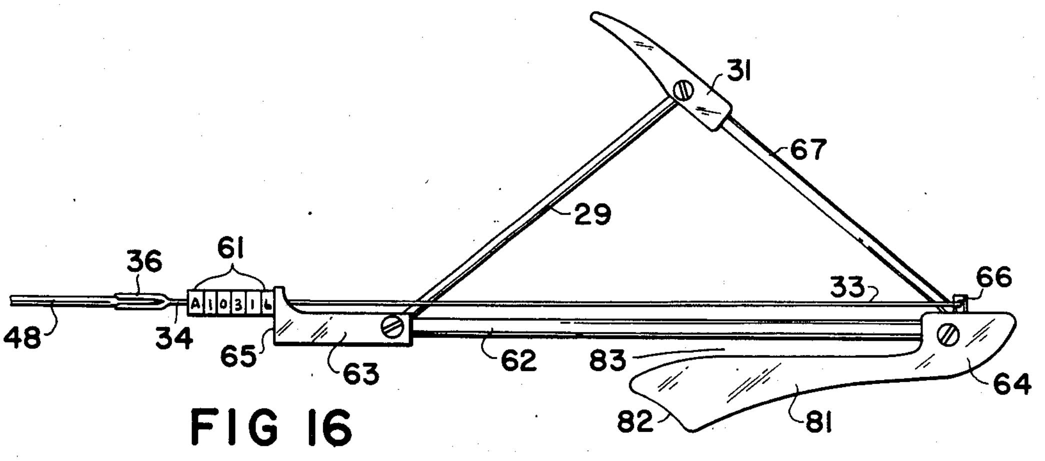
FIG. 16 is a side elevational view of the tool of this invention ready to apply identification sleeves to an electric wire.
Figure 17:
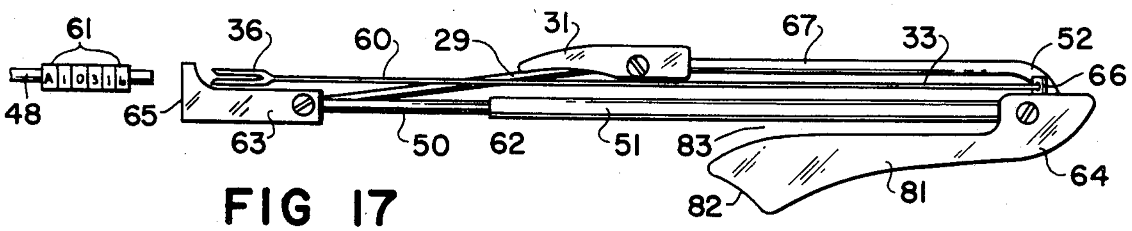
FIG. 17 is a side elevational view similar to FIG. 16 after applying sleeves to the wire.
Figure 18:
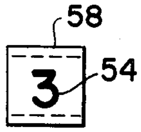
FIG. 18 is a front elevational view of an identifying sleeve.
Figure 19:
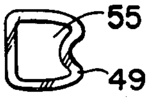
FIG. 19 is a side elevational view of the sleeve of FIG. 18.
Figure 21:
FIG. 21 is a front elevational view of the mandrel of FIG. 20.

In FIGS. 16–17 there is shown the operation of applying identifying sleeves to an electric wire. An individual sleeve 58 is shown in FIGS. 18 and 19. Sleeve 58 has one or more numbers or letters 54 printed on it and a central space 55 which is large enough to fit around the electric wire to be coded. One size of space 55 may be used for more than one size of wire if the sizes are reasonably close. However, different sizes of spaces are needed for wires which vary substantially in outside diameter. Each sleeve 58 is constructed with an inward fold 49 which will accommodate a small wire when the inward fold is not disturbed. If a larger wire is inserted the fold 49 expands outward. Sleeve 58 is preferably made of a flexible plastic or elastomeric material which has a certain amount of elasticity.

The first operation in using the tool of this invention is to choose the proper identifying sleeves 58 to be assembled into a code 61 of several sleeves 58 to be applied to the wire 48. The sleeves in the proper code order 61 are threaded onto the loading end 33 of mandrel 60 and assembled at discharge end 34 immediately behind fingers 36. As an example the code shown in FIGS. 16 and 17 is A10316.

Mandrel 60 with sleeve code 61 threaded thereon is attached to retainer 66 and connected to stripper guide 65 by spreading apart strips 42 at line 43 to place mandrel 60 in hole 44 (see FIG. 11) with fingers 36 and sleeves 61 ahead of stripper guide 65. Mandrel stripper 62 will be in the retracted position as shown in FIG. 16 at this point. The end of the electric wire 48 which is to be encoded is inserted inside of fingers 36 as shown in FIG. 16. Thumb tab 31 is then pressed down to the position shown in FIG. 17 which causes stripper guide 65 to move forward pushing sleeves 61 over fingers 36 and onto wire 48 leaving it encoded with sleeves 61 as shown in FIG. 17.

FIGS. 16 and 17 also show a modified design of aft end 64. A forward extension 81 having a concave portion 82 makes it easier to operate this tool by gripping the tool with the thumb on tab 31 and the index finger or middle finger on portion 82. Furthermore this design includes a space 83 which allows the tool to be hung from a pocket of belt when not in use.

Figure 20:
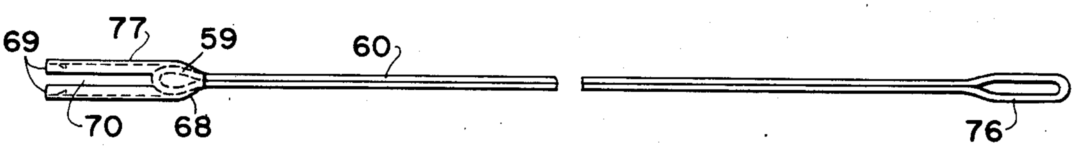
FIG. 20 is a side elevational view of a third type of mandrel of this invention.
Figure 22:
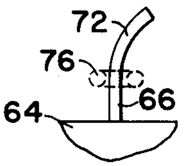
FIG. 22 is a front elevational view of a third type of retainer of this invention.
Figure 23:
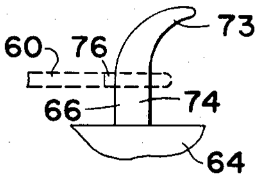
FIG. 23 is a side elevational view of the retainer of FIG. 22.
Figure 24:
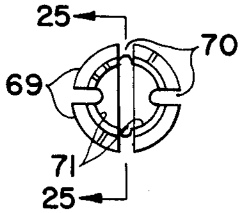
FIG. 24 is an enlarged view of the mandrel of FIG. 21.
Figure 25:
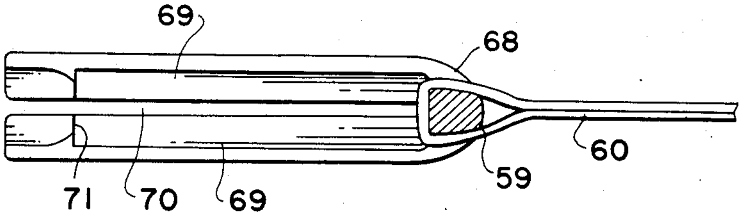
FIG. 25 is a cross sectional view taken at 25—25 of FIG. 24.

A third type of mandrel 60 and retainer 66 is shown in FIGS. 20–25. Mandrel 60 is formed of a length of wire doubled upon itself and soldered together to form a forward loop 59 and an aft loop 76. Forward loop 59 is affixed to head 77, preferably made of a hollow tube of plastic with a solid end 68 for attachment to loop 59. The tube of plastic is formed into fingers 69 separated from each other by spaces 70. Teeth 71 may be fashioned on the inside surfaces of head 77 so as to provide a means to grip the wire which is inserted into head 77. Retainer 66 for use with the mandrel of FIGS. 20, 21, 24, and 25 is shown in FIGS. 22 and 23. Retainer 66 is a thin curved sheet, shaped into a hook which is bent in two directions. As seen from the side (similar to the views in FIGS. 1, 3, 16 and 17), there is a base section 73 which is sufficiently wide from left to right in this view to be inserted into the opening of aft loop 76 (FIG. 20). The tip 73 is curved to the rear of base section 74 and tapered to a small size to permit easy entrance into loop 76 and to prevent mandrel 60 from inadvertently becoming detached from retainer 66. In the view of FIG. 22 looking to the rear from the forward end of mandrel 60 retainer 66 is bent to the right as at 72 which merely facilitates attaching loop 76 to tip 73 without interference with other component parts of the tool.

Figure 26:
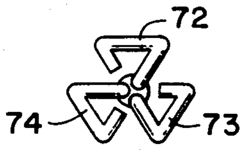
FIG. 26 is a front elevational view of a fourth type of mandrel of this invention.
Figure 27:
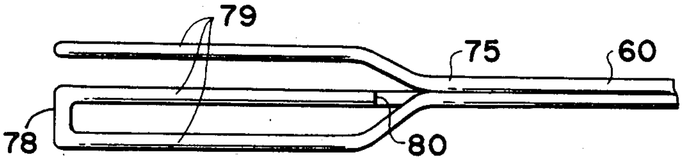
FIG. 27 is a side elevational view of the mandrel of FIG. 26.

In FIGS. 26 and 27 there is shown a fourth type of mandrel. Only the head end is shown, i.e. the end which grips the wire onto which the sleeves are placed. The aft end of this mandrel may be any of the types shown in FIGS. 4, 5, 8, 9, 22, and 23. The mandrel head 70 of FIGS. 26 and 27 is made of three wires twisted together or soldered together and forming three loops 72, 73, and 74, equally spaced radially to produce a framework with a hollow interior for insertion of a wire therein for encoding with sleeves. Each of loops 72, 73, and 74 begins at the main stem 75 of mandrel 60, extends to the forward end 78 of each 79, and doubled back to a free end 80 just short of main stem 75. If desirable, teeth such as 71 of FIG. 25 may be fashioned onto loops 72, 73, and 74.

The foregoing description refers to applying an identifying sleeve code to electric wires. There also is a need to apply similar codes to pipe or tubing carrying fluid to different parts of a building or machine, e.g. pneumatic apparatus, hydraulic machinery, or the like. The tool of this invention is equally applicable to handle such coding although it may be necessary to enlarge portions of the tool and use larger sleeves for tubes and piping.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A tool for applying identifications sleeves to electric wires including a sleeve mandrel and a mandrel stripper, said sleeve mandrel comprising an elongated thin straight rod having a loading end and a discharge end and adapted to have identification sleeves threaded onto said rod, said mandrel stripper comprising a plurality of telescoping tubular members having a retainer affixed to one end of said telescoping tubular members for anchoring the loading end of said mandrel and a stripping guide affixed to the other end of said telescoping tubular members adapted to encircle said mandrel adjacent the discharge end thereof, said mandrel having at said loading end fastening means for attachment to said retainer and at said discharge end a plurality of springy lengthwise fingers; and means to move said stripping guide linearly along said mandrel until said guide extends beyond said springy fingers.

2. The tool of claim 1 which includes lever means for moving said stripping guide linearly along said mandrel.

3. The tool of claim 2 wherein said lever means includes a first arm pivotally connected to said one end of said telescoping tubular members, a second arm pivotally connected to said other end of said telescoping tubular members, and a thumb tab pivotally attached to both said arms.

4. The tool of claim 1 wherein said fastening means includes a reduced dimension neck adjacent the loading end of said mandrel and said retainer includes a post having a slit adapted to receive said reduced dimension neck and incapable of receiving the full cross section of said mandrel.

5. The tool of claim 1 wherein said fastening means includes an eye in the loading end of said mandrel and said retainer includes a hook adapted to engage said eye.

6. The tool of claim 1 wherein said stripping guide comprises two spring biased strips abutting against each other along a line with a cutout portion centered on said line and fitting snugly around said mandrel.

7. The tool of claim 1 wherein said springy lengthwise fingers comprise thin strips affixed to said mandrel and extending lengthwise beyond the end of said mandrel and adapted to be closed about the axis of said mandrel to form a cross section sufficiently small to pass through said stripping guide.

8. The tool of claim 7 which additionally comprises inwardly directed teeth on the inside surfaces of said fingers adapted to grip said electric wire when inserted between said fingers.

9. A tool for applying identification sleeves to electrical wire comprising a sleeve mandrel and a mandrel stripper; said sleeve mandrel being an elongated cylindrical rod having a loading end and a discharge end, means for fastening said loading end to said mandrel stripper, a plurality of springy fingers splayed outwardly and lengthwise at said discharge end, said fingers adapted to close around the end of the electric wire to which said sleeves are to be applied; said mandrel stripper having a telescopic tubular body of two sections, a forward section and an aft section, said forward section including a stripper guide at the forward end thereof with two opposed cantilever spring members bearing against each other along a line with an opening centered on said line adapted to permit said mandrel to slidably pass therethrough, said aft end including a retainer adapted to receive said fastening means, a first arm pivotally attached to said aft end, a second arm pivotally attached to said forward end, said first and second arms pivotally attached to each other and adapted to move said forward section between an extended position and a withdrawn position by pivoting said first arm with respect to said second arm.

10. The tool of claim 9 which additionally comprises a thumb tab adjacent the pivotal joint between said first and second arms.

11. The tool of claim 9 wherein fastening means comprises a head at said loading end and reduced dimension neck adjoining said head to said mandrel, and said retainer comprises a cylindrical tube with its axis positioned vertically, a radial passageway through said tube of a size to permit passage of said head therethrough, a slot through the wall of said retainer and communicating with said passageway, said slot being of a size to permit passage of said neck but not said head therethrough.

12. The tool of claim 9 wherein fastening means comprises a head at said loading end and a reduced dimension neck adjoining said head to said mandrel, and said retainer comprises a solid rod with a vertical slit extending from the top of said retainer medially into the body of said retainer, said slit being of a size and shape to permit slidable entrance of said neck therein and is smaller than the full cross sectional dimension of said head.

13. The tool of claim 9 wherein said fastening means comprises an eye in said mandrel at said loading end and said retainer comprises a hook engageable within said eye.

14. The tool of claim 9 wherein said springy fingers include on the inside surfaces thereof adjacent their free ends teeth projecting inwardly and adapted to grip said electric wire when said fingers are closed around the wire.

* * * * *